United States Patent
Kim et al.

(10) Patent No.: US 9,452,934 B2
(45) Date of Patent: Sep. 27, 2016

(54) SYNTHESIS OF ULTRA-LARGE GRAPHENE OXIDE SHEETS

(71) Applicant: THE HONG KONG UNIVERSITY OF SCIENCE AND TECHNOLOGY, Hong Kong (CN)

(72) Inventors: Jang Kyo Kim, Hong Kong (CN); Jingjing Jia, Hong Kong (CN); Xiuyi Lin, Hong Kong (CN); Chak Ming Kan, Hong Kong (CN); Sheung Man Au, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 14/482,465

(22) Filed: Sep. 10, 2014

(65) Prior Publication Data
US 2015/0071844 A1   Mar. 12, 2015

Related U.S. Application Data

(60) Provisional application No. 61/960,186, filed on Sep. 12, 2013.

(51) Int. Cl.
*C01B 31/04* (2006.01)
*H01B 1/04* (2006.01)

(52) U.S. Cl.
CPC .............. *C01B 31/043* (2013.01); *H01B 1/04* (2013.01)

(58) Field of Classification Search
CPC .............. C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; H01B 1/04
USPC .............................. 423/448, 415.1; 427/113
See application file for complete search history.

(56) References Cited

U.S. PATENT DOCUMENTS

| 8,507,797 | B2 | 8/2013 | Veerasamy |
| 2010/0021708 | A1 | 1/2010 | Kong et al. |
| 2010/0028681 | A1* | 2/2010 | Dai .................. B82Y 30/00 428/408 |

(Continued)

OTHER PUBLICATIONS

Eda, Goki, et al. "Large-Area Ultrathin Films of Reduced Graphene Oxide as a Transparent and Flexible Electronic Material". Materials Science and Engineering, Rutgers University, Piscataway, New Jersey; Apr. 6, 2008; vol. 3; pp. 270-274.

(Continued)

*Primary Examiner* — Daniel C McCracken
(74) *Attorney, Agent, or Firm* — Nath, Goldberg, Meyer; Jerald L. Meyer; Stanley N. Protigal

(57) ABSTRACT

Ultra-large graphene oxide (UL-GO) sheets are formed using a Langmuir-Blodgett (LB) thin film process. Sulfuric acid and nitric acid are applied to interlayers of natural graphite flake to form graphite intercalation compound (GIC) powders. The GIC powders are expanded at a high temperature, and intercalating agents are used to further oxidize the expanded GIC powders by to exfoliating the EG into monolayer graphene oxide (GO) sheets. The GO is sequentially centrifuged and UL-GO sheets are collected. An LB thin film is prepared from the collected sheets and the thin films are reduced and chemically doped.

15 Claims, 5 Drawing Sheets

(56) References Cited

U.S. PATENT DOCUMENTS

| | | | | |
|---|---|---|---|---|
| 2010/0239869 | A1* | 9/2010 | Huang | H01M 4/663 428/426 |
| 2011/0052813 | A1 | 3/2011 | Ho et al. | |
| 2012/0128570 | A1* | 5/2012 | Krishnaiah | B82Y 30/00 423/415.1 |
| 2012/0129736 | A1 | 5/2012 | Tour et al. | |

OTHER PUBLICATIONS

Eda, Goki, et al. "Transparent and Conducting Electrodes for Organic Electronics From Reduced Graphene Oxide". Applied Physics Letters, American Institute of Physics; 2008; vol. 92; pp. 233305-1-233305-3.

Eda, Goki, et al. "Blue Photoluminescence from Chemically Derived Graphene Oxide". Advanced Materials, Wiley Inter Science; 2010; vol. 22; pp. 505-509.

Eda, Goki, et al. "Chemically Derived Graphene Oxide: Towards Large-Area Thin-Film Electronics and Optoelectronics". Advanced Materials, Wiley Interscience; 2010; vol. 22; pp. 2392-2415.

Zhao, Jinping, et al. "Efficient Preparation of Large-Area Graphene Oxide Sheets for Transparent Conductive Films". Shenyang National Laboratory for Materials Science, Institute of Metal Research, Chinese Academy of Sciences; Shenyang, P.R. China; Sep. 3, 2010; vol. 4, No. 9; pp. 5245-5252.

Zheng, Qingbin, et al. "Transparent Conductive Films Consisting of Ultralarge Graphene Sheets Produced by Langmuir-Blodgett Assembly". Department of Mechanical Engineering, The Hong Kong University of Science and Technology; Clear Water Bay, Kowloon, Hong Kong; Jun. 21, 2011; vol. 5, No. 7; pp. 6039-6051.

Zhu, Yanwu, et al. "Graphene and Graphene Oxide: Synthesis, Properties, and Applications". Advanced Materials, Wiley Inter Science; 2010; pp. 1-19.

Reina, Alfonso, et al. "Large Area, Few-Layer Graphene Films on Arbitrary Substrates by Chemical Vapor Deposition". Department of Materials Science and Engineering, et al., Massachusetts Institute of Technology, Cambridge, Massachusetts; Dec. 1, 2008; vol. 9, No. ; pp. 30-35.

Li, Xuesong, et al. "Graphene Films with Large Domain Size by a Two-Step Chemical Vapor Deposition Process". Department of Mechanical Engineering and the Texas Materials Institute, The University of Texas at Dallas, Dallas, Texas; Oct. 19, 2010; vol. 10; pp. 4328-4334.

Jiao, Liying, et al. "Narrow Graphene Nanoribbons from Carbon Nanotubes". Department of Chemistry and Laboratory for Advanced Materials, Stanford University, Stanford, California; Apr. 16, 2009; vol. 458; pp. 877-880.

Novoselov, K.S., et al. "Electric Field Effect in Atomically Thin Carbon Films". Department of Physics, University of Manchester, Manchester, United Kingdom, et al. Science; Oct. 22, 2004; pp. 1-5.

Wassei, Jonathan K., et al. "Graphene, a Promising Transparent Conductor". Materials Today ,Department of Chemistry and Biochemistry, UCLA; Mar. 2010; vol. 13, No. 3; pp. 52-59.

Cote, Laura J., et al. "Langmuir-Blodgett Assembly of Graphite Oxide Single Layers". Department of Materials Science and Engineering, Northwestern University, Evanston, Illinois; Oct. 22. 2008; vol. 131. pp. 1043-1049.

Lee, Vincent, et al. "Large-Area Chemically Modified Graphene Films: Electrophoretic Deposition and Characterization by Soft X-Ray Absorption Spectroscopy". Chemistry of Materials, Department of Chemistry, University at Buffalo, State University of New York, Buffalo, New York; Jul. 16, 2009; vol. 21; pp. 3905-3916.

Wang, Xuan, et al. "Transparent, Conductive Graphene Electrodes for Dye-Sensitized Solar Cells". Max Planck Institute for Polymer Research, Mainz, Germany; Dec. 11, 2007; vol. 8, No. 1; pp. 323-327.

Blake, Peter, et al. "Graphene-Based Liquid Crystal Device". School of Computer Science, University of Manchester, Manchester, United Kingdom; Apr. 30, 2008; vol. 8, No. 6; pp. 1704-1708.

Watcharotone, Supinda, et al. "Graphene-Silica Composite Thin Films as Transparent Conductors". Department of Mechanical Engineering, Northwestern University, Evanston, Illinois; Jun. 26, 2007; vol. 7, No. 7; pp. 1888-1892.

Su, Ching-Yuan, et al. "Electrical and Spectroscopic Characterizations of Ultra-Large Reduced Graphene Oxide Monolayers". Chemistry of Materials, American Chemical Society; Nov. 11, 2009; vol. 21; pp. 5674-5680.

Kim, Keun Soo, et al. "Large-Scale Pattern Growth of Graphene Films for Stretchable Transparent Electrodes". Nature; Feb. 5, 2009; vol. 457; pp. 706-710.

Geim, A.K., et al. "The Rise of Graphene". Manchester Centre for Mesoscience and Nanotechnology, University of Manchester, Manchester, United Kingdom; Mar. 2007; vol. 6; pp. 183-191.

\* cited by examiner

SYNTHESIS OF ULTRA-LARGE GRAPHENE OXIDE SHEETS

RELATED APPLICATION

The present Patent Application claims priority to U.S. Provisional Patent Application No. 61/960,186, filed Sep. 12, 2013, which is assigned to the assignee hereof and filed by the inventors hereof and which is incorporated by reference herein.

BACKGROUND

1. Field

The present disclosure relates to synthesis of ultra-large graphene oxide (UL-GO) sheets. More particularly, the disclosure relates to the application of UL-GO sheets for a Langmuir-Blodgett (LB) assembly technique to uniformly deposit the sheets onto both rigid and flexible substrates for producing optoelectronic thin films.

2. Background

Graphene, which consists of a two-dimensional monolayer of sp2-bonded carbon atoms, has received tremendous attention due to its unique transporting properties. It finds a rapidly growing application in the fabrication of transparent conductors. A key to success in such an application is to develop methods for producing large-size graphene sheets with high yields. The graphene sheets in current use for the fabrication of transparent conductors are very small, mostly with an area of hundreds of square micrometers at best. The large number of intersheet junctions between small-size graphene sheets leads to high intersheet contact resistance. Another key issue is how to deposit the graphene sheets onto the substrate uniformly in an aligned manner. Several well-established deposition techniques, including spin/spray coating, transfer printing, dip coating, electrophoretic deposition, and Langmuir-Blodgett (LB) assembly have been developed with varied success. Among these approaches, the LB assembly is the only technique that can realize controllable deposition of ultra-large graphene oxide (UL-GO) in a layer-by-layer manner. The thickness of GO films can be accurately controlled upon repeated deposition, leading to optimized optical and electrical properties of the final products.

Several methods are designed to directly synthesize graphene on a laboratory scale, like mechanical cleavage and unzipping carbon nanotubes, and the suitability of these methods for mass production remains unproven. Chemical vapor deposition (CVD) is currently the most popular approach for synthesizing graphene, which usually requires specific substrate materials that have to be removed chemically after the growth of graphene. The high cost of single crystal substrates and the ultrahigh vacuum conditions necessary to maintain the CVD growth significantly limit the use of the method for large-scale applications. In contrast, GO has been considered an important precursor for the fabrication of graphene owing to the scalability of production and the convenience in processing.

Previous techniques have been unable to fully exfoliate, leaving many unreacted graphite flakes. As a result, the film prepared using these GO sheets gives a transmittance of 78% or less.

The fabrication of GO involves exfoliation and oxidation of natural graphite (NG) flakes using potassium and one or more concentrated acids. However, previous techniques were either unable to fully exfoliate NG, or using destructive ultrasonication or long mechanical shaking that often result in severe damage and fragmentation of GO sheets. As a consequence, the vast majority of GO sheets produced in the past is reported to be very small in their sizes with an average area smaller than 1-10 $\mu m^2$; and the film prepared using these GO sheets gives a high sheet resistance with a transmittance of 78% or less. Aiming at fabrication of high-quality, large-size monolayer GO sheets with high yields, the alteration of oxidation and exfoliation, and use of high quality NG flakes are carefully investigated.

SUMMARY

Ultra-large graphene oxide (UL-GO) thin films are formed from ultra-large graphene oxide (UL-GO) sheets in a Langmuir-Blodgett (LB) process. Sulfuric acid and nitric acid are pre-intercalated to interlayers of natural graphite flake to form graphite intercalation compound (GIC) powders. The GIC powders are expanded at a high temperature and the expanded powders are further oxidized using intercalating agents to exfoliate EG into monolayer graphene oxide (GO) sheets. The GO is sequentially centrifuged and ultra-large area graphene oxide UL-GO sheets are collected. A Langmuir-Blodgett (LB) UL-GO thin film, comprised of plural monolayer UL-GO sheets, is prepared, and the UL-GO thin film is reduced and chemically doped to provide a chemically doping UL-GO thin film.

BRIEF DESCRIPTION OF THE DRAWINGS

FIG. 2A is a scanning electron microscope (SEM) image at low magnification. FIG. 2B is a field emission transmission electron microscope (FE-TEM) image. FIG. 2C is an atomic force microscope (AFM) image of as-prepared UL-GO sheets deposited on a Si substrate of GO sheets. FIG. 2D is a high resolution TEM image of a UL-GO sheet, with corresponding selected area electron diffraction pattern (SAED) in the inset.

DETAILED DESCRIPTION

Overview

The present disclosure describes producing ultra-large graphene oxide (UL-GO) sheets via three successive intercalations followed by a fractional centrifugation processes. Monolayer UL-GO sheets with a mean lateral size in the range of 50-200 µm and a yield exceeding 50% by weight are successfully produced. A Langmuir-Blodgett (LB) assembly technique is then used to transfer the UL-GO monolayers onto both the rigid and flexible substrates to produce highly conducting transparent thin films. After thermal reduction and chemical doping treatments, the optoelectronic thin films shows a sheet resistance of 459 Ω/sq at a transmittance of at least 90%. It is anticipated that transmittance will be at least 90% on a rigid substrate and a sheet resistance of 1100 Ω/sq at a transmittance of 91% on a flexible substrate; however, the sheet resistance will vary according to the specific design, and different ranges of transmittance are possible, such as 80%, 82% or 85% transmittance.

The present technique uses an energy-efficient and highly reproducible chemical exfoliation approach to produce gram quantities of UL-GO sheets and develops an inexpensive and high-quality method to deposit them onto a substrate uniformly in an aligned manner. Stable GO colloidal aqueous suspensions are produced by three successive intercalation procedures, namely pre-intercalation of mixed acids, expansion under high temperature and oxidation with strong oxidant agents such as potassium permanganate. In prior art applications, ultrasonication is used to agitate the particles when producing nanoparticles. Here, ultrasonication is completely eliminated during the whole process to prevent the breakage of monolayer GO sheets. Mild oxidation is employed, e.g. with an EG to potassium permanganate weight ratio=1:7 for 24 h. The GO are further sorted through three-step sequential centrifugation to obtain UL-GO sheets possessing lateral size up to 50-200 μm in diameter or 2500-40000 μm$^2$ (area), with a yield exceeding 50% by weight. Optoelectronic thin films are produced using the as-prepared UL-GO sheets that are deposited layer-by-layer on both rigid and flexible substrates by the Langmuir-Blodgett (LB) assembly technique. The resulting films comprising UL-GO sheets with a close-packed flat structure exhibit exceptionally high electrical conductivity and optical transmittance after reduction and chemical doping treatments.

The present technique provides an energy-efficient approach for the preparation of UL-GO sheets. Optoelectronic thin films made of the as-prepared UL-GO monolayers by the LB assembly technique are of high electrical conductivity and light transmittance, which have prospect for application in the field of transparent conducting thin films.

Process

Figure 1:
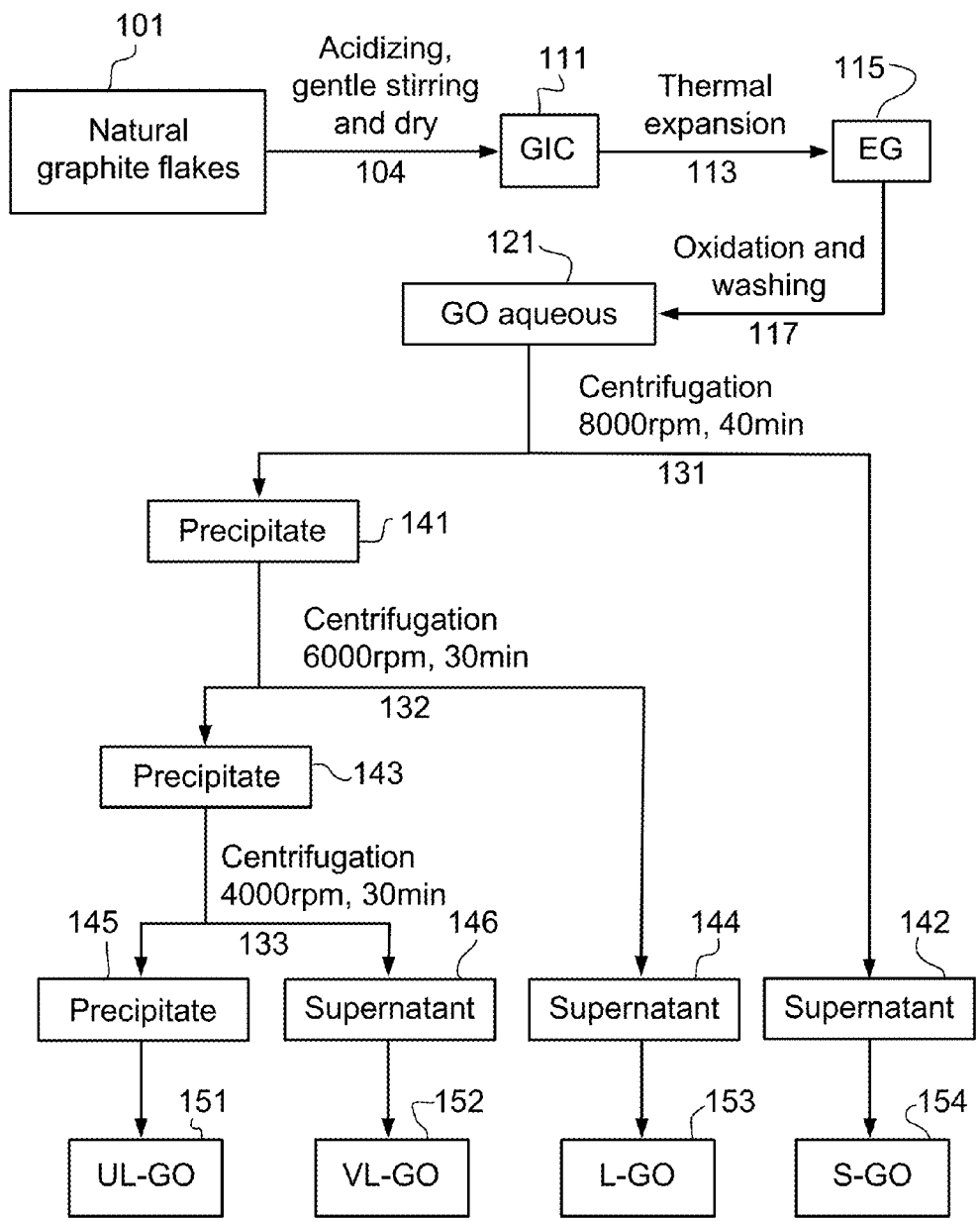
FIG. 1 is a flow diagram showing the operation of a program for preparation of ultra-large graphene oxide (UL-GO) sheets.

FIG. 1 is a flow diagram showing the operation of a program for preparation of ultra-large graphene oxide (UL-GO) sheets. Natural graphite flakes are obtained (step 101), and acid is added, gently stirred and allowed to dry (step 104). This renders a graphite intercalation compound (GIC) 111. The GIC is thermally expanded (step 113), rendering expanded graphite (EG) 115. Subsequent to the thermal expansion, the EG is oxidized and washed with DI water in sequence, which renders aqueous graphene oxide (GO) 121. The GO is centrifuged in three centrifugation steps (steps 131, 132 and 133), which renders precipitate, as separated from supernatant 141-142, 143-144 and 145-146. The result is ultra-large GO (151), very large GO (152), large GO (153) and small GO (154), respectively. The ultra-large GO 151 is rendered as a precipitate, whereas the very large GO 152, the large GO 153 and the small GO 154 are rendered as supernatant.

According to the present disclosure, UL-GO sheets are prepared by chemical exfoliation followed by centrifugation, involving pre-exfoliation of natural graphite flakes, acidizing, thermal expansion, additional oxidation and sorting of GO by sequential centrifugation, as illustrated in FIG. 1. The natural graphite flakes can be, by way of non-limiting example, natural graphite flakes supplied by Asbury Graphite Mills Ltd., of Asbury, N.J., US. The graphite precursors were selected based on quality of the graphite precursors and their sensitivity to various processing conditions in breaking into smaller GO sheets, rather than the original graphite size.

Figure 2A:
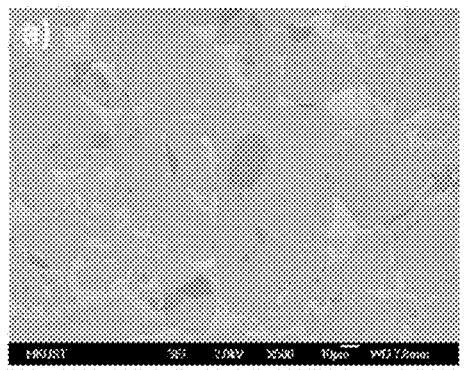
FIGS. 2A-2D are photomicrographs of as-prepared UL-GO sheets deposited on a Si substrate using the disclosed synthesis method.
Figure 2B:
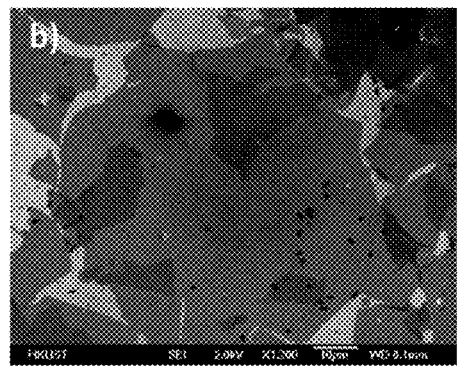
Figure 2C:
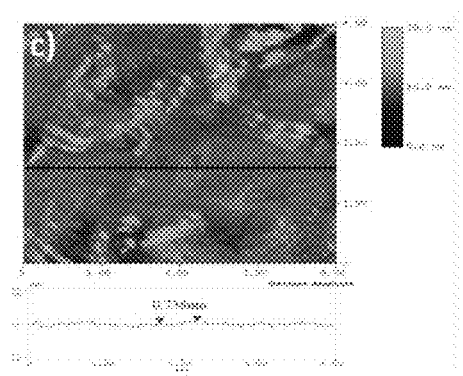
Figure 2D:
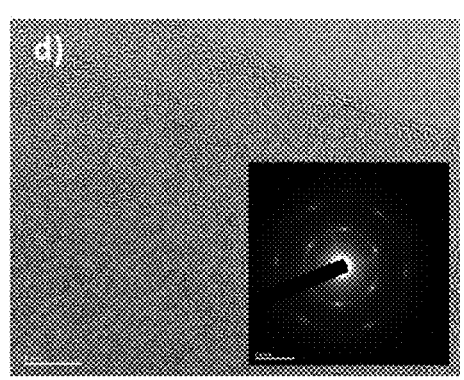

FIGS. 2A-2D are photomicrographs of as-prepared UL-GO sheets deposited on a Si substrate using the disclosed synthesis method. The morphology and thickness of monolayer UL-GO sheets are characterized using SEM, TEM and AFM. FIG. 2A is a scanning electron microscope (SEM) image at low magnification. FIG. 2B is a field emission transmission electron microscope (FE-TEM) image. FIG. 2C is an atomic force microscope (AFM) image of as-prepared UL-GO sheets deposited on a Si substrate (4 μm×4 μm scan) of GO sheets, showing monolayer of thickness 0.738 nm. FIG. 2D is a high resolution TEM image of a UL-GO sheet, with corresponding selected area electron diffraction pattern (SAED) in the inset.

As shown in FIGS. 2A and 2B, the individual UL-GO sheets exhibit the lateral size ranging from a few tens to ~200 μm, while the representative AFM image (FIG. 2C) shows that the flat, monolayer GO sheets had a thickness of ~0.8 nm. The high resolution TEM image of the GO sheet (FIG. 2D) and the corresponding selected area electron diffraction (SAED) pattern (shown in the inset of FIG. 2D) further confirm that the single layer GO partially collapsed into an amorphous structure.

Figure 3:
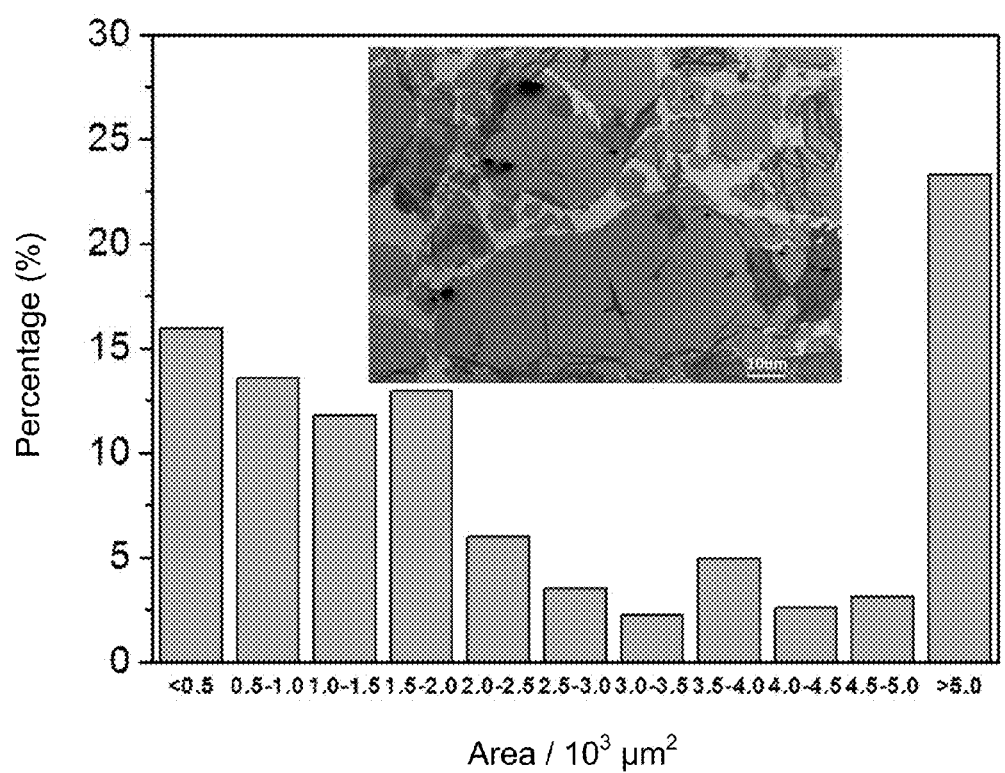
FIG. 3 is a graphic description depicting area distribution of UL-GO sheets. The inset shows typical SEM images used for measurements. The histograms of UL-GO area distributions were obtained by counting more than 200 sheets.

FIG. 3 shows the area distribution of the prepared UL-GO sheets. The histograms of UL-GO area distributions were obtained by counting more than 200 sheets. The insets shows typical SEM images used for measurements. FIG. 3 shows that the mean lateral size of the synthesized UL-GO sheets is between 50-200 nm with a yield exceeding 50% by weight. The graph shows the area distribution of the prepared UL-GO sheets. Optoelectronic thin films are produced using the UL-GO sheets that are deposited layer-by-layer on a substrate by the LB assembly technique.

Figure 4A:
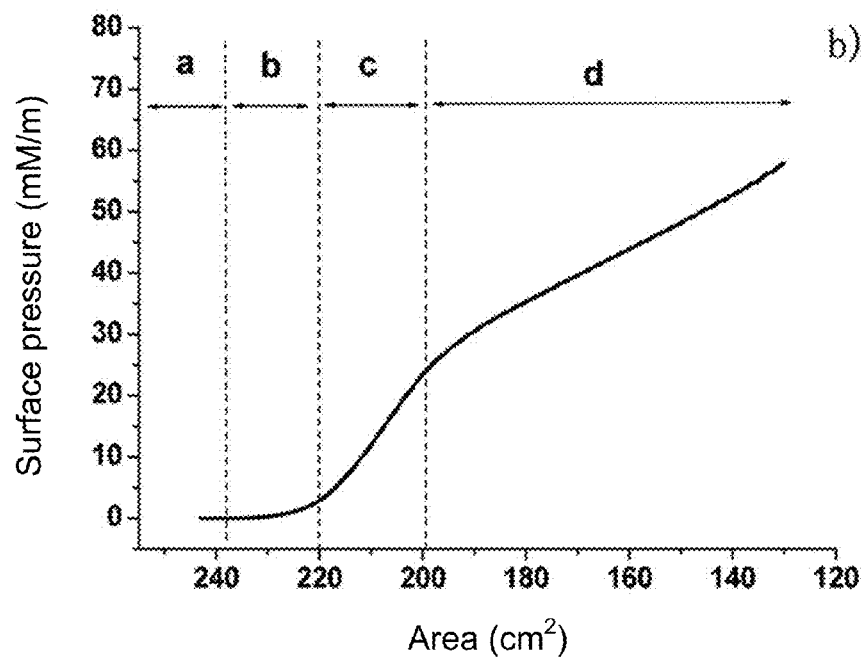
FIG. 4A is a surface pressure vs area plot showing four stages of the formation of GO monolayers in LB assembly.
Figure 4B:
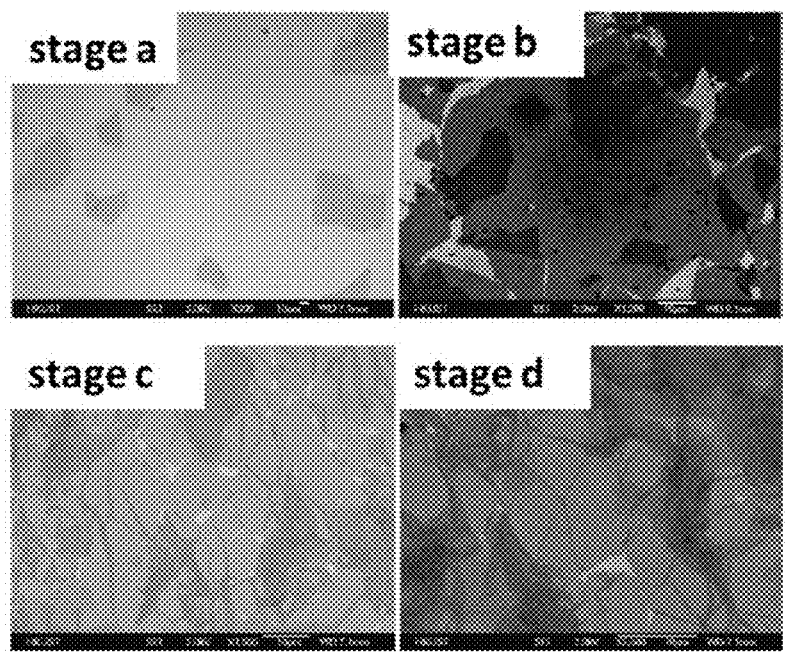
FIG. 4B is a series of SEM images showing that an increase in surface pressure leads to four stages.

FIG. 4A is a surface pressure vs area plot showing four stages of the formation of GO monolayers in LB assembly. FIG. 4B is a series of SEM images showing that an increase in surface pressure leads to four stages, from isolated UL-GO sheets (stage a), close-packed UL-GO sheets (stage b) to overlapped UL-GO sheets with some wrinkles (stage c), even to overlapped UL-GO sheets with extensive wrinkles (stage d). Through optimizing the LB processing conditions as shown in FIG. 4), the resulting films produced from UL-GO sheets with a close-packed flat structure exhibit exceptionally high electrical conductivity and transparency after thermal reduction and chemical doping treatments.

The disclosed technology provides a process for the preparation of UL-GO sheets and their application to produce optoelectronic thin films. The process has distinct advantages of low power consumption, high yields and being easy to be scaled-up for mass production. The technique uses the following sequence:

1: Pre-intercalation of sulfuric acid and nitric acid to interlayers of natural graphite flake
2: Expansion of graphite intercalation compound (GIC) powders at a high temperature
3: Further oxidation using intercalating agents to exfoliate EG into monolayer GO sheets
4: Sequential centrifugation of GO and collection of UL-GO sheets
5: Preparation of LB thin films
6: Reduction and chemical doping of UL-GO thin films Step 1—Pre-intercalation of sulfuric acid and nitric acid to interlayers of natural graphite flake: 5 g natural graphite flakes with 150 ml concentrated sulfuric acid are placed in a round flask, and stirred at 200-300 rpm for 0.5-1 h. 50 ml concentrated nitric acid is added and the mixture is left for reaction for 12-36 h at room temperature ($NG:H_2SO_4:HNO_3$=1 g:30 ml:10 ml). 200-600 ml deionized (DI) water is added into the mixture and stirred for 0.5-1 h. After being washed 3-5 times using DI water and dried at 60° C. for 24-48 h, graphite intercalation compound (GIC) is obtained.

Step 2—Expansion of GIC powders at a high temperature: The dry GIC is placed in a muffle furnace to thermally expand at 1050° C. for 10-20 seconds to produce expanded graphite (EG). Usually high temperatures (above 1000° C.) and fast heating rates are used. By way of non-limiting example, a temperature of 800° C. to 1200° C. is applied to effect the expansion of the GIC powders. Graphite has a burning temperature up to 1050-1550° C., and the reported critical exfoliation temperature is ~550° C.

Step 3—Further oxidation using intercalating agents to exfoliate EG into monolayer GO sheets: The mixture of 0.5 g EG and 100 ml concentrated sulfuric acid is added in sequence and keep stirring for 0.5-1 h, and 3.5 g potassium permanganate is then dropwise added while stirring ($EG:H_2SO_4:KMnO_4$=1 g:20 ml:7 g). The mixture is stirred at 35-60° C. for 18-48 h. The solution is transferred to an ice-water bath, and 100 ml DI water and 25 ml $H_2O_2$ are poured slowly into the mixture to find the colour of the suspension to change to light brown. Having stirred for another 1 h, the GO particles are washed with HCl solution (9:1-11:1 water:HCl by volume) three times, and then washed with DI water by centrifugation until the pH of the solution reach 5 to 6. The obtained GO sheets are diluted using DI water to 1-3 mg/ml and dispersed by gentle shaking for 10 min.

Step 4—Sequential centrifugation of GO and collection of UL-GO sheets: The as-prepared GO solution with polydispersity is sorted into four groups of uniform sizes via three rounds of centrifugation at gradually reduced speeds. The presence of grain boundaries on the basal plane of EG exacerbates the tendency of fragmentation of GO during the oxidation process, leading to inconsistent size and shape of GO sheets; see, for example, FIG. 2A. The GO dispersion is initially centrifuged at 8000 rpm for 40 min using a table-top centrifuge (SIGMA 2-16P), dividing into supernatant and precipitate. The sediment is collected for the second round of centrifugation; while the supernatant is labeled as small GO (S-GO). The collected precipitate is dispersed in water again and centrifuged at 6000 rpm for 30 min, producing supernatant and precipitate, the former being labeled as large GO (L-GO). The precipitate is dispersed in water again for the third round of centrifugation at 4000 rpm for 30 min. The produced supernatant is designated as very large GO (VL-GO) and the precipitate as UL-GO sheets.

Step 5—Preparation of LB thin films: A DI water/volatile solvent mixture in the ratio of 1:5 is filled into the LB trough (KSV Instruments Ltd, MiniMicro LB System) and the UL-GO dispersion is slowly spread onto the water surface dropwise using a glass syringe. The solution is applied at a rate of 100 μL/min up to a total volume of 5 ml, and the UL-GO monolayer formed thereby is stabilized for about 20 min before compression. The UL-GO monolayer is compressed by moving barriers at a speed of 5-15 mm/min until the surface pressure reached 10 mN/m. The GO monolayer is transferred to the treated substrate by pulling out the substrate from the water at a speed of 0.1-0.5 mm/min. Solid substrates made from silicon, glass, quartz or mica are cleaned for about 30 min before deposition using a Piranha solution comprising a sulfuric acid and peroxide in the ratio of $V(H_2SO_4):V(H_2O_2)$=7:3. Flexible polyethylene terephthalate (PET) substrates are treated using oxygen plasma (Plasma Cleaner, MARCH) for 5 min. After the deposition of each GO monolayer, the substrate is dried in an oven at 80° C. for 30 min. The deposition of the next GO layer is repeated to produce thin films comprising 2 to 10 UL-GO monolayers.

Step 6—Reduction and chemical doping of UL-GO thin films: The rigid substrates made from quartz are loaded inside a ceramic container with open ends, which is introduced into a furnace (Thermcraft/Eurotherm) with a vacuum of $10^{-5}$ Torr. The films are heated with a continuous flow of ultra-pure argon at a rate of 10° C./min, held at 400° C. for 1.5 hr at $10^{-3}$ Torr, and are allowed to cool to room temperature for about 20 min. Subsequently, the films are heated to 1050° C. at a rate of 10° C./min and are held for 30 min. After cooling to room temperature, ambient air is admitted to the furnace and the films are recovered to obtain reduced UL-GO (rUL-GO). Subsequently, the rUL-GO is subjected to additional chemical doping treatments to obtain chemically doped reduced UL-GO (C-rUL-GO). The chemical doping comprises (i) dipping in a $HNO_3$ bath for 3 h and drying with gentle nitrogen flow; and (ii) dipping in a $SOCl_2$ bath for 24 h and drying with gentle nitrogen flow.

For the flexible PET substrates, the as-prepared UL-GO thin films are reduced by immersing in 57% hydrogen iodide (HI) acid in a sealed cuvette, and placed the cuvette in an oil bath at 90° C. for 10 min. The rUL-GO thin films are washed using ethanol three times to remove excessive HI, and dried at 60° C. in an oven. The rUL-GO is subjected to additional chemical doping treatments to obtain C-rUL-GO: namely, (i) dipping in a $HNO_3$ bath for 3 min and drying with gentle nitrogen flow; and (ii) dipping in a $SOCl_2$ bath for 2 h and drying with gentle nitrogen flow.

Materials:

The graphite flakes used in the described non-limiting example are natural graphite flakes (supplied by Asbury Graphite Mills Ltd., US) comprising about 85 wt. % of them larger than 500 μm in later size. The following reagents and solvents are used without further purification: sulfuric acid (95.5-96.5%, General Chemical), nitric acid (69-72%, Fisher), hydrochloric acid (37%, Sigma-Aldrich), potassium permanganate (≥99%, RDH) and hydrogen peroxide (30%, Honeywell), methanol (min 99.8%, Duskan), acetone (min 99.8%, Scharlau), thionyl chloride, ($SOCl_2$, min 98%, Sigma-Aldrich), hydrogen iodide (57 wt %, Acros organics), and ethanol (96%, Sucrogen).

Characterization:

The area/lateral size, thickness and morphologies of UL-GO sheets are characterized using SEM (JSM-6700F), AFM (Scanning Probe Microscope-NanoScope) and TEM (JEOL-2010F). The transparency and sheet resistance of UL-GO thin films are measured using the UV/VIS spectroscopy (Perkin-Elmer Lambda 20) and four-point probe method (Scientific Equipment & Services), respectively.

Fabrication Process:

Experiments for production of UL-GO sheets are carried out using a 3-necked round flask equipped with a refluxing condenser and a table-top centrifuge. The agitation of the solution is provided by a magnetic stirrer with a rotating speed controller. Deposition of graphene thin films on a substrate is realized using Minimicro LB system.

Figure 5:
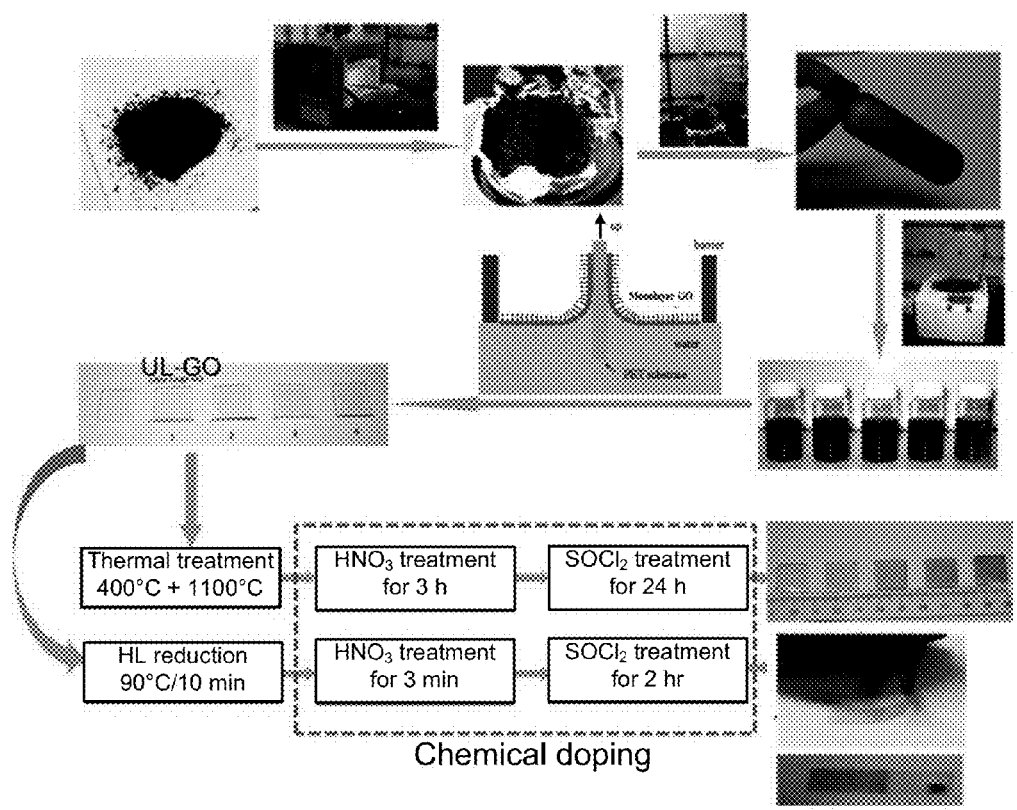
FIG. 5 shows the experimental setup for deposition of graphene thin films on a substrate.

FIG. 5 shows the experimental setup for deposition of graphene thin films on a substrate, implementing the process depicted in the flow chart of FIG. 1.

Experiment 1:

5 g natural graphite flakes with 150 ml concentrated sulfuric acid are placed in a round flask, which is stirred at 200 rpm for 0.5 h, and 50 ml concentrated nitric acid is added to react for 12 h at room temperature. After that, 200 ml deionized water is added into the mixture which is stirred for 0.5 h. After being washed 3 times by deionized water and dried at 60° C. for 24, GIC is obtained. The GIC is placed into a Muffle furnace to thermally expand for 15 s at 1050° C. to obtain EG. 0.5 g EG and 100 ml concentrated sulfuric acid are added in sequence and stirred for 0.5 h before 3.5 g potassium permanganate is dropwise added while stirring. The mixture is then stirred at 45° C. for 24 h. The mixture solution is transferred into an ice-water bath, and 100 ml DI water and 15 ml $H_2O_2$ are poured slowly into the mixture to find the colour of the suspension to change to light brown. Having stirred for another 0.5 h, the GO sheets are then washed and centrifuged with HCl solution (9:1 water:HCl by volume) three times at 10000 rpm, then centrifuged again and washed with DI water until the pH of the solution becomes 4-6. The obtained GO sheets are diluted using DI water to 1 mg/ml and then gentle shaked for 10 min. The resulting GO solution is further centrifuged at 8000 rpm for 40 min, 6000 rpm for 30 min and 4000 rpm for 30 min to obtain GO with different size groups. The UL-GO is obtained from the precipitate after centrifugation at 4000 rpm for 30 min.

Experiment 2:

For the synthesis of GO thin films on a rigid substrate, a DI water/methanol mixture in the ratio of 1:5 is filled into the LB trough and the UL-GO aqueous solution is slowly spread onto the water surface using a glass syringe. The solution is applied at a rate of 100 μL/min up to a total volume of 5 ml, and the UL-GO monolayer formed thereby is stabilized for about 20 min before compression. The UL-GO monolayer is compressed by moving barriers at a speed of 10 mm/min until the surface pressure reached 10 mN/m. Quartz substrates are cleaned for 30 min before deposition using a Piranha solution comprising a sulfuric acid and peroxide in the ratio of $V_{H2SO4}:V_{H2O2}$=7:3. The treated substrate is immersed and pulled out from the trough at a speed of 0.1 mm/min to deposit the UL-GO monolayer onto the substrate. Upon deposition of each GO monolayer, the substrate is dried in an oven at 80° C. for 1 h. The deposition of subsequent GO layers is repeated to produce thin films comprising multiple UL-GO monolayers. To reduce the GO films, the substrate is loaded inside a ceramic container with open ends, which is introduced into a furnace with a vacuum of $10^{-5}$ Torr. The substrates are heated to 400° C. with a continuous flow of ultra-pure argon at a rate of 10° C./min, held at the same temperature for 1.5 h at $10^{-3}$ Torr, and are allowed to cool to room temperature to stay for about 20 min. Subsequently, the films are heated to 1050° C. at a rate of 10° C./min and are held at the same temperature for 30 min. After cooling to room temperature, ambient air is admitted to the furnace and the films are recovered to obtain rUL-GO films. The rUL-GO films are subjected to additional chemical doping treatments to obtain C-rUL-GO: namely, (i) dipping in a $HNO_3$ bath for 3 h and drying with gentle nitrogen flow; and (ii) dipping in a $SOCl_2$ bath for 24 h and drying with gentle nitrogen flow. The resultant transparent conducting films containing UL-GO sheets show a sheet resistance of 459 Ω/sq at a transmittance of 90% along with a remarkable $\sigma_{DC}/\sigma_{Op}$ ratio of 7.29, the opto-electrical properties of which are even better than those of the graphene films prepared by CVD on a Ni substrate.

Experiment 3:

The procedure employed for the synthesis of GO thin films on a flexible substrate is essentially similar to experiment 2 with some modifications to obtain optimized conditions after extensive preliminary experiments. A DI water/acetone mixture in the ratio of 1:5 is filled into the LB trough and the UL-GO aqueous solution is slowly spread onto the water surface using a glass syringe. The solution is applied at a speed of 100 μL/min up to a total volume of 5 ml, and the UL-GO monolayer formed thereby is stabilized for about 20 min before compression. The UL-GO monolayer is compressed by moving barriers at a speed of 15 mm/min until the surface pressure reached 10 mN/m. The PET substrate is pre-treated using oxygen plasma for 5 min to produce a hydrophilic surface for proper wetting by water and efficient deposition of GO layers. The treated substrates are immersed and pulled out from the trough at a speed of 0.1 mm/min to deposit UL-GO monolayers. Upon deposition of each GO monolayer, the substrate is dried in an oven at 80° C. for 1 h. The deposition of subsequent GO layers is repeated to produce thin films comprising multiple UL-GO monolayers. Subsequently, the UL-GO thin films are reduced by immersing in HI in a sealed cuvette, and the cuvette is placed in an oil bath at 90° C. for 10 min. The rUL-GO thin films are washed using ethanol three times to remove excessive HI and dried at 60° C. in an oven. The rUL-GO is subjected to additional chemical doping treatments to obtain C-rUL-GO: namely, (i) dipping in a $HNO_3$ bath for 3 min and drying with gentle nitrogen flow; and (ii) dipping in a $SOCl_2$ bath for 2 h and drying with gentle nitrogen flow. The transparent conducting films made from UL-GO sheets show a sheet resistance of 1100 Ω/sq at a transmittance of 91% along with a $\sigma_{DC}/\sigma_{Op}$ ratio of 3.55, which outperforms other flexible transparent conductors prepared by transfer printing, spin-coating and dip-coating.

CONCLUSION

It will be understood that many additional changes in the details, materials, steps, centrifuge speeds, process times, concentrations and arrangement of parts, which have been herein described and illustrated to explain the nature of the subject matter, may be made by those skilled in the art within the principle and scope of the invention as expressed in the appended claims.

What is claimed is:

1. A method for forming graphene thin films, the method comprising:
    pre-intercalating of sulfuric acid and nitric acid to interlayers of natural graphite flake to form graphite intercalation compound powders;
    expanding of graphite intercalation compound powders at a high temperature;
    further oxidizing using intercalating agents to exfoliate EG into monolayer graphene oxide sheets;
    sequential centrifuging of graphene oxide and using the sequential centrifuging to collect graphene oxide as monolayer graphene oxide sheets with a mean lateral size in the range of 50-200 μm;
    preparing of Langmuir-Blodgett thin films comprised of plural monolayer graphene oxide sheets; and
    reducing and chemical doping, with —Cl or —$SOCl_2$ groups, to form doped Langmuir-Blodgett thin films.

2. The method of claim 1 further characterized by:
    subsequent to pre-intercalating the graphite flake, washing the graphite to form the graphite intercalation compound powders.

3. The method of claim 1, comprising applying a temperature of 800° C. to 1200° C. to effect the expansion of the graphite intercalation compound powders.

4. The method of claim 1, wherein said further oxidizing comprises adding a mixture of sulfuric acid, followed by adding potassium permanganate, followed by transferring the mixture to a chilled water bath, followed by washing with an acid solution, and then followed by washing with water, and rendering graphene oxide sheets.

5. The method of claim 4, further comprising, after adding the potassium permanganate, adding hydrogen peroxide, wherein the acid solution comprises an hydrochloric acid solution.

6. The method of claim 5, further comprising, prior to adding the hydrogen peroxide, stirring the mixture and diluting the mixture with water to render the graphene oxide sheets.

7. The method of claim 1, wherein the sequential centrifugation of the graphene oxide and collection of graphene oxide sheets with lateral size in the range of 50-200 μm comprises sorting the graphene oxide solution with polydispersity into plural groups of uniform sizes via said centrifugation in combination with dispersing the graphene oxide with water, and with said centrifugation performed at gradually reduced speeds to cause the graphene oxide to dividing into supernatant and precipitate.

8. The method of claim 1, further comprising the preparation of the Langmuir-Blodgett thin films comprising:
   applying the graphene oxide dispersion onto a water surface;
   compressing the graphene oxide monolayer to increase surface pressure;
   transferring the graphene oxide monolayer to a treated substrate selected from the group consisting of silicon, glass, quartz, mica or flexible polyethylene terephithalate (PET); and
   repeating the sequence of preparation of the Langmuir-Blodgett thin films until a desire thickness is reached.

9. The method of claim 1, wherein the reduction and chemical doping of graphene oxide thin films comprising heating the films on the substrate in a vacuum environment, followed by recovering the films to obtain reduced graphene oxide thin film.

10. The method of claim 9, further comprising, subsequent to recovering the films, subjecting the films to doping treatments to obtain thermally reduced graphene thin film, the doping treatments comprising at least one of dipping in a $HNO_3$ bath, and dipping in a $SOCl_2$ bath, and followed by drying.

11. The method of claim 1 further characterized by:
reducing and chemical doping of the graphene oxide thin films prior to preparing of Langmuir-Blodgett thin films.

12. The method of claim 1 further characterized by:
reducing and chemical doping of the graphene oxide thin films subsequent to preparing of Langmuir-Blodgett thin films.

13. An optoelectronic thin film, comprising:
a plurality of monolayer graphene oxide sheets reduced to form a Langmuir-Blodgett thin film having a transmittance of at least 82% and a DC to optical conductivity ratio of at least 7.29, and formed according to the method of claim 1.

14. An optoelectronic graphene thin film, comprising:
a plurality of monolayer graphene oxide sheets with a mean lateral size in the range of 50-200 μm and reduced to form a Langmuir-Blodgett thin film having a transmittance of at least 82%, and formed by reducing and chemical doping of Langmuir-Blodgett thin films formed by:
pre-intercalation of sulfuric acid and nitric acid to interlayers of natural graphite flake to form graphite intercalation compound powders;
expansion of graphite intercalation compound powders at a high temperature;
further oxidation using intercalating agents to exfoliate expanded graphite into monolayer graphene oxide sheets;
sequential centrifugation of graphene oxide and collection of graphene oxide sheets with lateral size in the range of 50-200 μm;
preparation of Langmuir-Blodgett thin films comprised of plural monolayer graphene oxide sheets; and
thermal reduction and chemical doping of the graphene oxide thin films with —Cl or —$SOCl_2$ groups, to form doped Langmuir-Blodgett thin films.

15. The optoelectronic graphene thin film of claim 14, further comprising:
the a plurality of layers of graphene oxide film comprising said plural monolayer graphene oxide sheets obtained by the preparation, reduction and chemical doping of the graphene oxide sheets reduced to form graphene Langmuir-Blodgett thin films.

* * * * *